United States Patent Office 3,313,942

Patented Apr. 11, 1967

3,313,942

PHOTOSENSITIVE APPARATUS FOR ASCERTAINING AND FOLLOWING GUIDE MARKS ON GOODS

Klaus Lange, Munich, Germany, assignor to Heinz Mahlo, Saal (Danube), Germany

Filed Dec. 7, 1964, Ser. No. 416,388
Claims priority, application Germany, Dec. 10, 1963, M 59,204
4 Claims. (Cl. 250—219)

The present invention relates to method of and apparatus for ascertaining and following of guide marks on goods. More particularly, the invention relates to such method and apparatus for use in connection with webs of textile fabrics, paper, or foils of material.

The guide marks to be ascertained and followed may be transparent marks, for example, in textiles the marks can be represented by missing woof or warp threads. The marks may also have a variable light transparency, they may be represented by colored threads, seams, paint marks, glue spots, or any other elements ascertainable by light sensitive, magnetic or capacitive sensing means. The ascertaining and following of such guide marks is necessary for the purpose of guiding and working the webs or sheets of material in a predetermined manner, for example, when cutting is to be performed at the positions where such marks appear.

Prior to the present invention optical means were employed for the above purpose, said optical means comprising two photocells arranged on one side of the material in such a manner that upon proper position of the guide marks relative to the photocells each cell received an equal amount of light from a light source arranged on the other side of the material. If the guide marks departed from their proper position or path one photocell was covered more and the other less, thus permitting to derive or produce a control voltage for adjusting guide means to return the guide marks to proper position.

Such prior art devices frequently operate in an improper manner because an exact adjustment of the photocells to equal sensitivity is necesasry, and since any soiling of one of the photocells will cause misadjustments. Another drawback of the known devices resides in that without the provision of special means, they are not capable of finding the guide marks after a lateral jump in the path of such marks has occurred, for example, where a seam or glue connects adjacent webs or sheets.

In view of the above it is the main object of the invention to remove the drawbacks inherent in the use of two sensing devices.

It is a further object of the invention to provide a simple and reliable method for the ascertaining and following of guide marks on web or sheet material, which method will permit the positive finding of such guide marks even after a lateral jump has occurred in the path of such marks.

Another object of the invention is to provide a simple and reliable apparatus for performing said method.

A further object is to provide a control circuit which will cause the sensing device to cover a larger or smaller area to be sensed.

Another object of the invention is to employ a single sensing device.

According to the invention there is provided a method for ascertaining and following of guide marks in webs or sheets of goods by periodically sensing an area comprising said guide marks and their vicinity. This feature permits employing a single sensing device. Such periodic sensing may be accomplished by continuously varying the position of the sensing device or a member thereof relative to the path of said guide marks. A special adjustment of the sensitivity of the sensing device is not necessary. The inclusion of the vicinity of the guide marks within the sensed area makes proper ascertaining possible even if wide lateral jumps occur in the path of such guide marks.

The sensing motion preferably follows a circular path but may also oscillate back and forth along a straight path. When moving the sensing device or a member thereof periodically, the web or sheet of material can move longitudinally and it is not necessary that the sheet or web moves in a direction extending perpendicularly to the direction of longitudinal motion. It is also an advantage to move a member of said sensing device and to keep other members of such device stationary.

Another advantage of the invention is seen in that the phase position of a synchronous motor which drives the sensing device can be employed as a reference value in evaluating the pulses produced by the sensing device when passing the path of the guide marks. It is also possible to employ for such evaluation reference pulses produced in synchronism with the motion of the sensing device by an independent reference pulse source.

Furthermore, it is possible to provide a control circuit which will cause the sensing device to cover a larger or smaller area in the vicinity of the guide marks.

According to the invention there is further provided an apparatus for performing the above method, comprising a light source arranged adjacent to one side or surface of a web or sheet of material, a photoelectric sensing device arranged adjacent the opposite side or surface of said web or sheet, a rotatable disk having a central aperature therein, reflecting means attached to one surface of said disk and forming an angle of 45° relative to an axis of rotation of the disk, and a stationary photoelectric cell arranged underneath said aperture in the disk. Preferably the disk is mounted to a hollow shaft of a synchronous motor.

In order that the invention may be clearly understood it will now be described with reference to the accompanying drawings, in which.

Figure 3A:
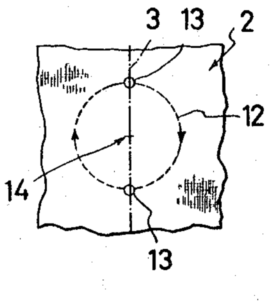
Figure 3B:
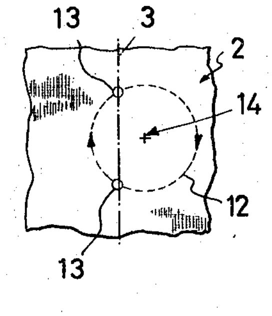
Figure 4A:
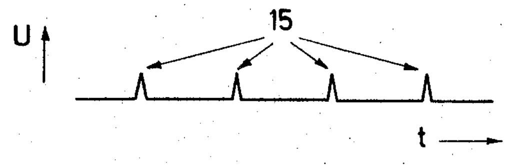
Figure 5A:
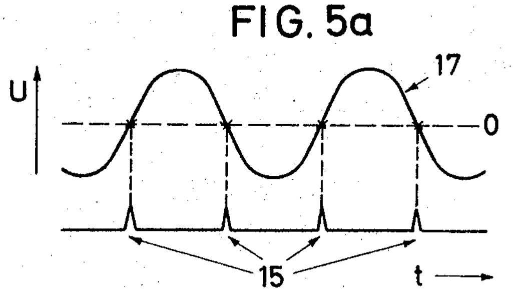
Figure 4B:
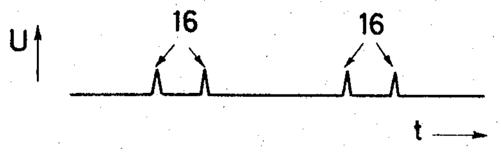
Figure 5B:
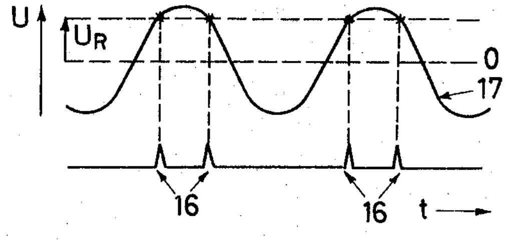

FIGS. 3*a* and 3*b* are top views of sections of a web or sheet of material and showing different sensings;

FIGS. 4*a* and 4*b* are pulse trains corresponding to the sensing according to FIGS. 3*a* and 3*b* respectively;

FIGS. 5*a* and 5*b* show reference voltages relating to the pulse trains of FIGS. 4*a* and 4*b* respectively.

Figures 1, 2:
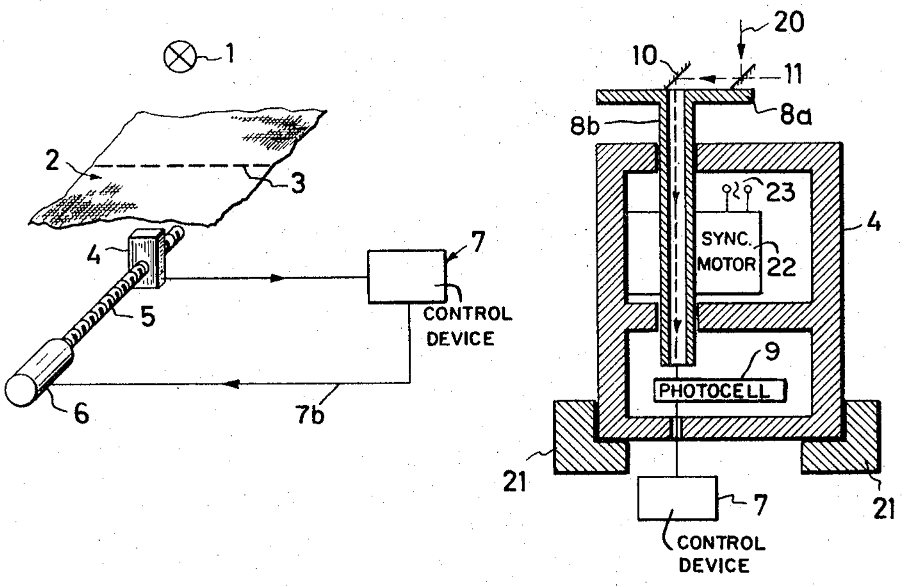
FIG. 1 is a schematic perspective view of the apparatus according to the invention.
FIG. 2 is a sectional view of the sensing device.

Referring to FIG. 1 light source 1 is shown above sheet or web 2 of material which comprises guide marks 3 to be ascertained and followed. Under sheet or web 2 there is arranged housing 4 including a photoelectric sensing device which is movable across guide marks 3 by means of screw shaft 5. The signals or pulses produced by the sensing device are fed to control means 7 which causes motor 6 to drive screw shaft 5 either in forward or reverse direction, whereby the extent of an area to be sensed can be controlled.

Said photoelectric sensing device comprises photocell 9, disk 8*a* mounted to one end of hollow shaft 8*b* and means 22 for rotating said disk and hollow shaft which is rotatably supported in housing 4. It should be noted that hollow shaft 8*b* may be the shaft of a synchronous motor. Disk 8*a* has attached thereto two light reflecting means, such as prismatic rods 10 and 11. Light beam 20 will make a circular motion upon rotation of disk 8*a*. If the space above the disk is uniformly illuminated, the photoelectric cell will produce a constant output signal upon rotation of the disk. However, if some sectors of a sensed circle are lighter or darker, then said rotation will result in periodic signals.

FIGS. 3*a* and 3*b* show a portion of sheet or web 2 with guide marks 3 underneath of which the sensing device performs a sensing motion represented by circle 12. Points 13 on the periphery of such circle are being sensed periodically due to such motion.

In FIG. 3*a* the path of guide marks 3 is in proper position relative to the position of the sensing device because the path of guide marks 3 extends through center 14 of rotation of the sensing device.

The signal produced by photocell 9 in the situation illustrated in FIG. 3*a*, is shown in FIG. 4*a* and comprises pulses 15 which are produced each time when a sensed point 13 coincides with the path of guide marks 3.

FIG. 4*b* illustrates output pulse pairs 16 resulting when center 14 of rotation does not extend through the path of guide marks 3. The result of this is that the spacing between the pulses of pulse pairs 16 is shorter than the spacing between adjacent pulse pairs 16. The shorter spacing or interval corresponds to the shorter portion along the circumference of circle 12 whereas the longer spacing or interval corresponds to the longer portion along the circumference of circle 12 between points 13 as shown in FIG. 3*b*. It should be noted that the pulses of pairs 16 may coincide with each other when the path of guide marks 3 goes through the periphery of circle 12. In such instance the pulses will be produced with wide intervals therebetween.

The evaluation of pulses 15 or pulse pairs 16 can be accomplished, for example, by driving the sensing device or a member thereof with a synchronous motor 22 connected to a sine supply voltage at terminals 23. Such sine supply voltage furnishes a reference sine wave 17 in fixed phase relationship with the rotation of the sensing device as shown in FIG. 5*a*. The points where the sine wave goes through zero must be located relative to the time axis *t* at such positions that they coincide with pulses 15 as produced in accordance with FIG. 3*a* when the path of guide marks 3 extends through center 14.

When guide marks 3 deviate from their proper path then pulses 16 are produced according to FIG. 4*b* at times in which the sine voltage is positive or negative depending upon the direction of deviation of the guide marks from their proper path. FIG. 5*b* shows that in the example the deviations occur in a direction corresponding to the positive half wave of the sine wave.

The voltage values occurring at the pulse times can be stored in a capacitor by means of phase discriminator diode circuits which are so well known in the art that a specific reference to such circuits is not necessary. These circuits produce a control voltage UR shown in FIG. 5*b* which is proportional to said deviation and which after amplification is fed to motor 6 through line 7*b*. Preferably the hollow shaft 8*b* can be the shaft of the synchronous motor, said shaft having a bore therethrough. Housing 4 is guided on a support 21.

It is to be understood that the invention is not limited to the particular embodiments and features described and shown but also comprises any modifications within the scope of the appended claims.

I claim:

1. In an apparatus for ascertaining and following of guide marks on moving goods, by means of a single photoelectric sensing device which senses the light of a light source arranged adjacent one side of said guide marks, said light source influencing the sensing device through reflecting means arranged on the other side of the guide marks opposite the light source, the improvement comprising, (a) scanning disk having a central aperture and a surface facing the goods;

(b) means for rotating the scanning disk about an axis extending through the central aperture;

(c) said reflecting means including two reflecting surfaces, one reflecting surface being attached to the surface of the disk at the periphery of the disk and at an angle of 45° relative to said axis, the other reflecting surface being attached to the surface of the disk close to said central aperture and also at an angle of 45° relative to said axis, said reflecting surfaces facing each other for directing a light beam through the central aperture of the disk along said axis;

(d) a single photocell arranged opposite said central aperture of the scanning disk and stationary relative to the disk;

(e) drive means for moving the sensing device laterally to a direction of motion of the goods, and (f) control means electrically connected to the photocell and to said drive means for producing control signals in response to signals emanating from said photocell to control the drive means.

2. The apparatus according to claim 1, wherein said disk rotating means comprise a shaft having a longitudinal bore therethrough, said disk being mounted to one end of the shaft with the central aperture of the disk in alignment with the bore of the shaft, said single photocell being arranged opposite the other end of the shaft.

3. The apparatus according to claim 1, wherein said disk rotating means comprise a synchronous motor.

4. The apparatus according to claim 1, wherein said drive means for the sensing device comprise a motor connected to the control means for driving the sensing device through a searching motion relative to the guide marks in response to failure of said sensing device to sense the guide marks.

References Cited by the Examiner

UNITED STATES PATENTS

| | | | |
|---|---|---|---|
| 2,208,420 | 7/1940 | Gullisen | 250—219 |
| 2,792,504 | 5/1957 | Slamar et al. | 250—219 |
| 2,873,381 | 2/1959 | Lauroesch | 250—236 |
| 2,933,668 | 4/1960 | Brouer | 250—202 X |

RALPH G. NILSON, *Primary Examiner.*

WALTER STOLWEIN, *Examiner.*